United States Patent [19]

Zander et al.

[11] Patent Number: 5,359,378
[45] Date of Patent: Oct. 25, 1994

[54] FILM CASSETTE WITH LOCKABLE LIGHT SHIELD

[75] Inventors: Dennis R. Zander, Penfield; Douglas M. Csaszar, Williamson, both of N.Y.

[73] Assignee: Eastman Kodak Company, Rochester, N.Y.

[21] Appl. No.: 181,286

[22] Filed: Jan. 13, 1994

[51] Int. Cl.⁵ .............................................. G03B 17/26
[52] U.S. Cl. .................... 354/275; 354/277; 242/348.4
[58] Field of Search ............... 354/275, 277, 281; 242/71.1

[56] References Cited

U.S. PATENT DOCUMENTS

| | | | |
|---|---|---|---|
| 4,255,034 | 3/1981 | Harvey et al. | 354/275 X |
| 4,802,633 | 2/1989 | Beery | 242/71.1 |
| 5,083,721 | 1/1992 | Okutsu et al. | 242/71.1 |
| 5,112,003 | 5/1992 | Covington et al. | 242/71.1 |
| 5,115,268 | 5/1992 | Kitagawa et al. | 354/275 |
| 5,200,777 | 4/1993 | Zander | 354/275 |
| 5,231,438 | 7/1993 | Smart | 354/281 |

*Primary Examiner*—Michael L. Gellner
*Assistant Examiner*—J. K. Han
*Attorney, Agent, or Firm*—Roger A. Fields

[57] ABSTRACT

A film cassette comprises light blocking means supported for movement to a light blocking position for preventing ambient light from entering the cassette interior and to a non-blocking position. The light blocking means has a cavity for receiving a driver element in driving engagement to allow the driver element to move the light blocking means from its light blocking position to its non-blocking position. A locking pawl protrudes into the cavity to secure the light blocking means in its light blocking position and is adapted to be displaced from the cavity to release the light blocking means when the driver element is received in the cavity.

7 Claims, 2 Drawing Sheets

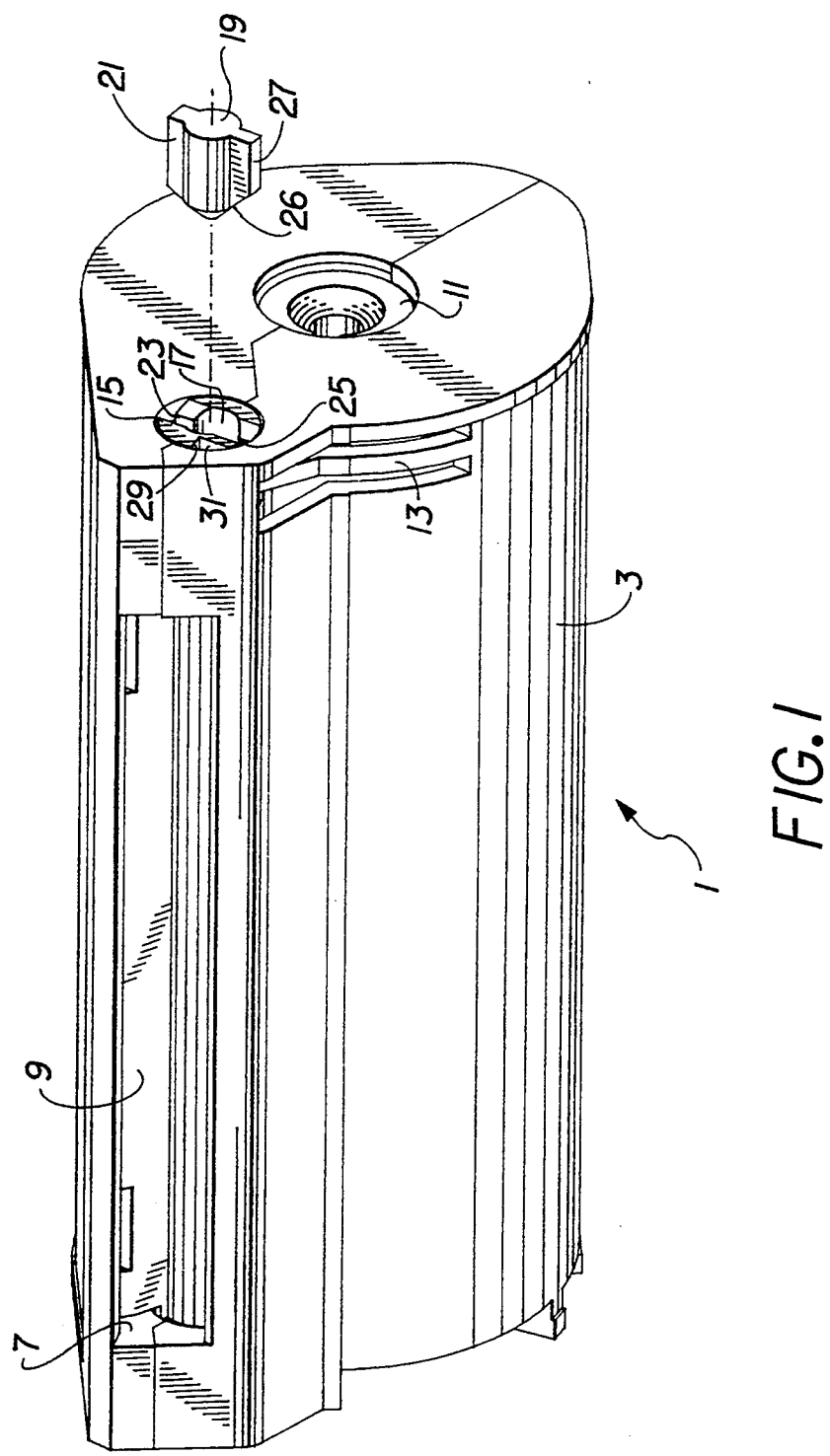

FILM CASSETTE WITH LOCKABLE LIGHT SHIELD

CROSS-REFERENCE TO RELATED APPLICATION

Reference is made to commonly assigned copending application Ser. No. 08/078,671, entitled FILM CASSETTE WITH INTERACTING SPOOL LOCK AND LIGHT SHIELD and filed Jun. 16, 1993, in the name of Anthony DiRisio.

FIELD OF THE INVENTION

The invention relates generally to the field of photography, and in particular to film cassettes. More specifically, the invention relates to a film cassette with a movable light shield for preventing ambient light from entering the cassette interior. The light shield can be locked open or closed.

BACKGROUND OF THE INVENTION

It is known to provide a film cassette with a light shield that can be closed to prevent ambient light from entering the cassette interior and can be opened to permit film movement out of and into the film cassette.

For example, commonly assigned U.S. Pat. No. 4,255,034, issued Mar. 10, 1981, discloses a film disk cartridge in which a core or hub for the disk film has a central opening for receiving a splined post (of a camera) in driving engagement to rotate successive sectors of the disk film beneath an exposure window in the housing of the cassette. A cover member is supported inside the housing for rotation about the core between a closed position over the exposure window and an open position removed from the exposure window. Engagement of a flexible tab on the cover member and a fixed tooth on an inside wall of the housing secures the cover member releasably in its closed position. An access hole is located in the housing to receive a release pin (of the camera) which disengages the tab from the tooth to permit the cover member to be rotated from its closed position to its open position. A separate pin (of the camera) engages the cover member to rotate the cover member to its open position.

PROBLEM TO BE SOLVED BY THE INVENTION

In U.S. Pat. No. 4,255,034, a release pin is used to disable the locking mechanism for the cover member and a separate pin is used to rotate the cover member from its closed position to its open position. This arrangement results in an unduly complex design for the camera as well as for the film disk cartridge.

SUMMARY OF THE INVENTION

According to one aspect of the invention, a film cassette comprising light blocking means supported for movement to a light blocking position for preventing ambient light from entering the cassette interior and to a non-blocking position, and locking means for engaging the light blocking means to secure the light blocking means in its light blocking position and adapted to be moved out of engagement with the light blocking means to release the light blocking means, is characterized in that:

the light blocking means has a cavity for receiving a driver element in driving engagement to allow the driver element to move the light blocking means from its light blocking position to its non-blocking position and is open to the locking means to permit the driver element to move the locking means out of engagement with the light blocking means when the driver element is received in the cavity.

More specifically, the locking means includes a locking pawl that protrudes into the cavity to secure the light blocking means in its light blocking position and is adapted to be displaced from the cavity to release the light blocking means when the driver element is received in the cavity.

According to another aspect of the invention, a driver element to be used with a film cassette that has light blocking means supported for movement to a light blocking position for preventing ambient light from entering the cassette interior and to a non-blocking position and has a locking pawl for engaging the light blocking means to secure the light blocking means in its light blocking position, is characterized in that:

the driver element is configured to be received in a cavity in the light blocking means to drivingly engage the light blocking means to move the light blocking means from its light blocking position to its non-blocking position and includes cam means for moving the locking pawl out of engagement with the light blocking means when the driver element is received in the cavity.

ADVANTAGEOUS EFFECT OF THE INVENTION

Thus, a relatively simple design can be realized for a camera as well as for the film cassette.

BRIEF DESCRIPTION OF THE DRAWINGS

FIG. 1 is a front perspective view of a film cassette with a lockable light shield according to a preferred embodiment of the invention;

DETAILED DESCRIPTION OF THE INVENTION

The invention is disclosed as being embodied preferably in a film cassette. Because the features of a film cassette are generally known as typified by commonly assigned U.S. Pat. No. 5,200,777, issued Apr. 6, 1993, the description which follows is directed in particular only to those elements forming part of or cooperating directly with the disclosed embodiment. It is to be understood, however, that other elements may take various forms known to a person of ordinary skill in the art.

Figure 3:
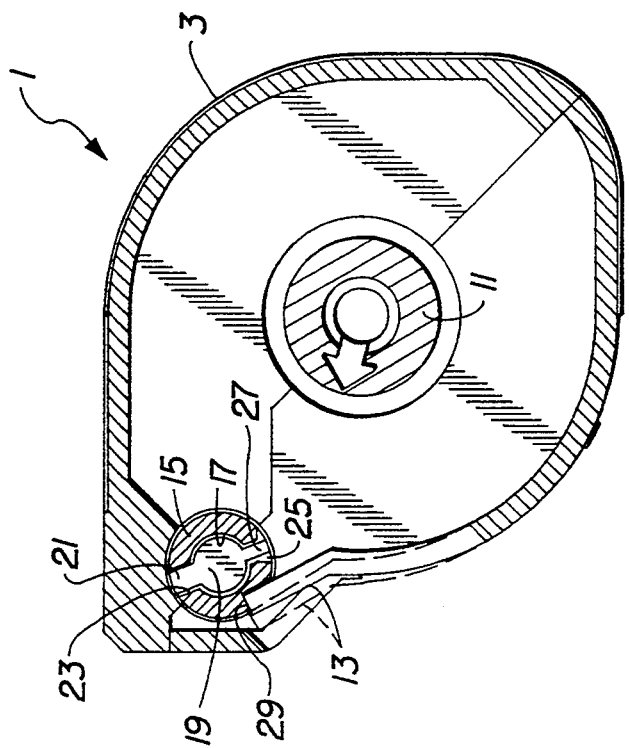
FIG. 3 is a sectional view of the film cassette, showing the light shield locked in an open or non-blocking position.
Figure 2:
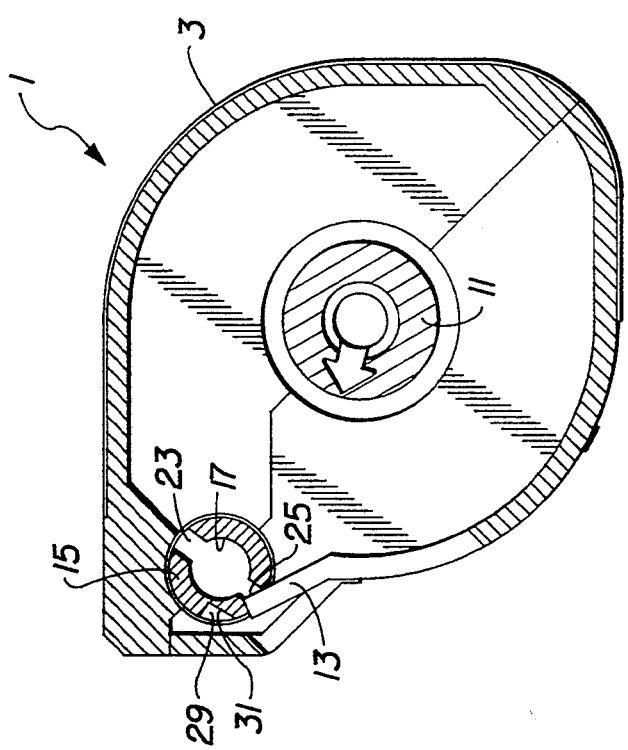
FIG. 2 is a sectional view of the film cassette, showing the light shield locked in a closed or light blocking position.

Referring now to the drawings, FIGS. 1-3 show a film cassette 1 comprising a cassette shell or housing 3 with a film egress/ingress slot 7, light blocking means preferably in the form of a light shield 9, a film spool 11 for supporting a film roll (not shown), and locking means for the light shield preferably in the form of a locking pawl 13.

The light shield 9 has a pair of opposite end posts, only one 15 shown, which are supported via the cassette shell 3 to mount the light shield for rotation to a closed or light blocking position, shown in FIGS. 1 and 2, for preventing ambient light from entering the cassette interior through the film egress/ingress slot 7, and an open or non-blocking position, shown in FIG. 3. for permitting film movement out of and into the cassette interior through the film egress/ingress slot.

The end post 15 of the light shield 9 has a coaxial cavity 17 for receiving in driving engagement a rotary driver element 19 (of a camera) to allow the driver element to rotate the light shield between its closed and open positions. As can be seen in FIG. 1, the driver element 19 has an integral driver rib 21 which is received in a driver opening 23 of the cavity 17 to drivingly engage the light shield 9.

The locking pawl 13 is integrally formed with the cassette shell 3, and it is inherently biased to protrude into a locking opening 25 of the cavity 17 to secure the light shield 9 in its closed position as shown in FIG.2. In addition, the locking pawl 13 is resilient. This permits the locking pawl 13 to be pushed out of the locking opening 25 by the tapered edge 26 of an integral cam rib 27 of the driver element 19 when the driver element is received in the cavity 17 (to locate the cam rib in the locking opening). See the broken line depiction of the locking pawl in FIG. 3.

The end post 15 has a locking notch 29 located to receive the locking pawl 13, as shown in FIG. 3, when the light shield 9 is in its open position, to secure the light shield in the open position. The locking notch 29 is partly defined by a ramp 31 that serves to push the locking pawl 13 out of the locking notch when the light shield 9 is rotated clockwise in FIG. 3 out of its open position.

Operation

FIG. 2 shows the locking pawl 13 in the locking opening 25 of the cavity 17 to secure the light shield 9 in its closed position.

When the driver element 19 is received in the cavity 17, its cam rib 27 is located in the locking opening 25 of the cavity to cause the tapered edge 26 of the cam rib to push the locking pawl 13 out of the locking opening, and its driver rib 21 is located in the driver opening 23 of the cavity to drivingly engage the light shield 9. Rotation of the driver element 19, then, counter-clockwise in FIG. 3, similarly rotates the light shield 9 from its closed position to its open position, allowing the locking pawl 13 to drop into the locking notch 29 to secure the light shield in the open position.

When the driver element 19 is rotated clockwise in FIG. 3, it similarly rotates the light shield 9 from its open position to its closed position. This causes the ramp 31 of the locking notch 29 to push the locking pawl 13 out of the locking notch, allowing the locking pawl to come to rest against the cam rib 27 of the driver element 19 (which is located in the locking opening 25 of the cavity 17).

When the driver element 19 is removed from the cavity 17, the cam rib 27 is fully withdrawn from the locking opening 25 of the cavity 17 before the driver rib 21 is fully withdrawn from the driver opening 23. This ensures that the driver rib 21 remains in the driver opening 23 until after the locking pawl 13 drops into the locking opening 25 to secure the light shield 9 in its closed position The invention has been described with reference to a preferred embodiment. However, it will be appreciated that variations and modifications can be effected by a person of ordinary skill in the art without departing from the scope of the invention.

PARTS LIST FOR FIGS. 1–3

1. film cassette
3. cassette housing
7. film egress/ingress slot
9. light shield
11. film spool
13. locking pawl
15. end post
17. coaxial cavity
21. driver rib
23. driver opening
25. locking opening
26. tapered edge
27. cam rib
29. locking notch
31. ramp

What is claimed is:

1. A film cassette comprising light blocking means supported for movement to a light blocking position for preventing ambient light from entering the cassette interior and to a non-blocking position, and locking means engages said light blocking means to secure the light blocking means in its light blocking position and is adapted to be moved out of engagement with the light blocking means to release the light blocking means, is characterized in that:

said light blocking means has a cavity for receiving a driver element in driving engagement to allow the driver element to move the light blocking means from its light blocking position to its non-blocking position and is open to said locking means to permit the driver element to move the locking means out of engagement with the light blocking means when the driver element is received in said cavity.

2. A film cassette comprising light blocking means supported for movement to a light blocking position for preventing ambient light from entering the cassette interior and to a non-blocking position, is characterized in that:

said light blocking means has a cavity for receiving a driver element in driving engagement to allow the driver element to move the light blocking means from its light blocking position to its non-blocking position; and a locking pawl protrudes into said cavity to secure said light blocking means in its light blocking position and is adapted to be displaced from the cavity to release the light blocking means when the driver element is received in the cavity.

3. A film cassette as recited in claim 2, wherein said light blocking means includes a notch for receiving said locking pawl to secure the light blocking means in its non-blocking position.

4. A film cassette as recited in claim 2, wherein said locking pawl is resilient to permit the locking pawl to be displaced from said cavity.

5. A film cassette as recited in claim 2 or 4, wherein said locking pawl is integrally formed with a cassette shell.

6. A film cassette as recited in claim 3, wherein said light blocking means is rotatable between its light blocking and non-blocking positions, and said cavity is located coaxially in said light blocking means.

7. A driver element to be used with a film cassette that has light blocking means supported for movement to a light blocking position for preventing ambient light from entering the cassette interior and to a non-blocking position and has a locking pawl for engaging the light blocking means to secure the light blocking means in its light blocking position, is characterized in that:

said driver element is configured to be received in a cavity in the light blocking means to drivingly engage the light blocking means to move the light blocking means from its light blocking position to its non-blocking position and includes cam means for moving the locking pawl out of engagement with the light blocking means when the driver element is received in the cavity.

* * * * *